United States Patent [19]

Brockmeyer

[11] 4,343,704
[45] Aug. 10, 1982

[54] CERAMIC FOAM FILTER

[75] Inventor: Jerry W. Brockmeyer, Hendersonville, N.C.

[73] Assignee: Swiss Aluminium Ltd., Chippis, Switzerland

[21] Appl. No.: 227,134

[22] Filed: Jan. 22, 1981

[51] Int. Cl.³ .............................................. B01D 39/20
[52] U.S. Cl. .................................... 210/509; 210/510; 501/80
[58] Field of Search .................... 75/68 R, 76; 501/80, 501/103; 210/773, 509, 510

[56] References Cited

U.S. PATENT DOCUMENTS

| | | | |
|---|---|---|---|
| 3,709,706 | 1/1973 | Sowman | 210/509 |
| 3,747,765 | 7/1973 | Nowak | 210/510 |
| 3,751,271 | 8/1973 | Kimura | 210/510 |
| 3,878,104 | 4/1975 | Guerrero | 210/510 |
| 3,893,917 | 7/1975 | Pryor | 75/76 |
| 3,939,079 | 2/1976 | Uchiyama | 210/510 |
| 3,947,363 | 3/1976 | Pryor | 501/80 |
| 3,962,081 | 6/1976 | Yarwood | 75/68 R |
| 4,116,761 | 9/1978 | Head | 210/509 |
| 4,264,346 | 4/1981 | Mann | 210/510 |
| 4,265,659 | 5/1981 | Blome | 210/510 |

Primary Examiner—Ernest G. Therkorn
Attorney, Agent, or Firm—Bachman and LaPointe

[57] ABSTRACT

The present invention resides in an improved ceramic foam filter particulary useful for filtering molten metal. The composition of the ceramic foam material is as follows: 50 to 70% $Al_2O_3$; 2 to 10% micron sized reactive alumina; 1 to 5% montmorillonite; 1 to 10% ceramic fibers; and from 5 to 25% of a ceramic binder or air setting agent.

8 Claims, No Drawings

CERAMIC FOAM FILTER

BACKGROUND OF THE INVENTION

Molten aluminum in practice generally contains entrained solids which are deleterious to the final cast metal product. These entrained solids usually derive from three sources. Some are particles of aluminum oxide which are drawn into the liquid stream from the floating oxide layer on its surface, and some entrained particles are fragments of furnace lining, transfer trough and other portions of the molten aluminum handling equipment which are eroded and entrained in the flowing aluminum stream, and some particles are precipitates of insoluble impurities such as intermetallics, borides, carbides or precipitates of other aluminum compounds, such as chlorides. When these inclusions appear in the final cast product after the molten aluminum is solidified, they cause such final product to be less ductile or to have poor finishing characteristics. Accordingly, it is desirable to remove entrained solids from the molten aluminum stream before it is cast into a solid body which may be used as such or subjected to forming operations such as rolling, forging, extrusion, etc.

Filtering processes to remove entrained solids from liquids are accomplished by passing the solid-laden liquid through a porous filter medium that will not pass the solids. Filtering molten metal in general, and molten aluminum in particular, creates special problems because the liquid is so aggressive that it is difficult to find a filter medium capable of withstanding it.

In general, two methods of filtering are used for removing entrained solids from molten aluminum alloys before casting. The most common filter medium is an open weave glass cloth screen placed in the metal transfer trough, around the spout or even in the molten metal pool in the top of the solidifying ingot. These cloth screens are able to remove only the larger sizes of inclusions from the metal and are easily ruptured during use because the glass fibers become very weak at the temperature of molten aluminum. In another prior art procedure, molten aluminum is filtered through a bed of loose alumina particles, for example, of tabular alumina, but it often suffers from the drawbacks normally associated with bed filters in that it passes too many solids, there is a strong tendency to channeling which prevents efficient use, and pore size of the filter is not easily controlled but rather readily changes under condition of use so that, even when originally of proper dimension, it cannot be efficiently maintained. In addition, the metal must be kept constantly molten when the filter is not in use.

An improved method for filtering and removing entrained solids from molten aluminum alloys is disclosed in U.S. Pat. No. 3,947,363, assigned to the assignee of the instant invention, and employs a ceramic foam filter having an open cell structure characterized by a plurality of interconnected voids surrounded by a web of ceramic. The composition of the ceramic foam material employed is an alumina-chromia composition comprising preferably 45 to 55% $Al_2O_3$; 10 to 17%; $Cr_2O_3$; 0.5 to 2% bentonite and from 12 to 17% of a ceramic binder such as aluminum orthophosphate. The use of the ceramic foam filter disclosed in U.S. Pat. No. 3,947,363 greatly increased filtration efficiency however the use of a larger percentage of chromia in the ceramic foam composition results in a number of disadvantages. One disadvantage is that chromia is relatively high in cost compared to alumina and is only available from limited areas and therefore a potential supply problem exists. A further problem is an effluent problem since $Cr^{+6}$ is a known carcinogen and while the chromia does not contain measurable $Cr^{+6}$ it does remain a concern. In addition to the foregoing, when large size filters are produced in the preferred thickness of two inches (2") there is a problem with the strength of the filter. The use of thicker filters would add to the cross sectional strength but would likewise result in a substantial cost increase without any noticeable benefit on filtration. Naturally, in light of the foregoing, it would be highly desirable to increase the intrinsic strength of the ceramic composition while at the same time eliminating chromia from the composition.

Accordingly, it is a principal object of the present invention to provide a ceramic foam filter which has considerable strength so that it can be used as a filter for a variety of molten metals.

It is an additional object of the present invention to provide a ceramic foam filter characterized by strength integrity which can be prepared at reasonable cost.

It is a further object of the present invention to provide a ceramic foam filter as aforesaid which does not contaminate the melt.

It is a still further object of the present invention to provide a ceramic foam filter as aforesaid which obtains high filtration efficiency.

Further objects and advantages of the present invention will appear hereinafter.

SUMMARY OF THE INVENTION

In accordance with the present invention it has now been found that the foregoing objects and advantages may be readily obtained.

The present invention provides a highly efficient, ceramic foam material for use in filtering molten metal, especially molten aluminum. The ceramic foam material of the present invention is characterized by having an open cell structure with a plurality of interconnected voids surrounded by a web of said ceramic material. The composition of the ceramic foam material of the present invention is as follows: 50 to 70% $Al_2O_3$; 2 to 10% micron-sized reactive alumina; 1 to 5% montmorillonite; 1 to 10% ceramic fibers; and from 5 to 25% of a ceramic binder or air setting agent which is substantially nonreactive to the molten metal.

In addition to the foregoing, the present invention contemplates an aqueous slurry for use in preparing the foregoing high temperature resistant ceramic foam, wherein said slurry contains the materials listed above in the foregoing amounts.

DETAILED DESCRIPTION

In accordance with the present invention the ceramic foam filter described above has been found to be particularly useful in filtering molten metal, especially molten aluminum. The high temperature resistant characteristics of the filter of the present invention are particularly useful under the severe use conditions encountered in the filtration of molten metal. Furthermore, the composition of the ceramic filter of the present invention has been found to be such that there is no difficulty with contamination of the metal.

The ceramic filter of the present invention is a low cost material which may be conveniently used on a disposable basis. The molten metal is poured through the ceramic foam material at a rate of from 5 to 500 and preferably 30 to 100 cubic inches per square inch of filter area per minute and entrained solids are thereby removed from the molten metal. The filter is prepared in accordance with the general procedure outlined in U.S. Pat. No. 3,893,917, which is assigned to the assignee of the present invention. As described therein, an open cell, flexible organic foam material is provided having a plurality of interconnected voids surrounded by a web of said foam material. The aqueous slurry described above is prepared and the foam material is impregnated therewith so that the web is coated therewith and the voids are substantially filled therewith. The impregnated material is then compressed to expel about 80% of the slurry and the balance is uniformly distributed throughout the foam material, preferably so that some pores are blocked in a uniformly distributed manner to increase the tortuosity. The compression is released so that the web remains coated with the slurry and the material is dried. The dried material is then heated to first burn out the flexible organic foam and then sinter the ceramic coating, thereby providing a fused ceramic foam having a plurality of interconnected voids surrounded by a web of bonded or fused ceramic in the configuration of the flexible foam. The foregoing procedure is fully described in the aforesaid U.S. patent and the disclosure of said patent is hereby incorporated by reference.

The principal component of the ceramic foam material of the present invention is $Al_2O_3$. In accordance with the present invention the $Al_2O_3$ is present in two forms, the principal form being calcined $Al_2O_3$ in a size range of from about 100 mesh to 500 mesh, preferably about 325 mesh average in amounts of from 55 to 70%, preferably 60 to 65%. $Al_2O_3$ is particularly desirable for use as a ceramic foam filter since it is not attacked by molten aluminum or molten copper; whereas silicon is attacked by these materials. Furthermore, the alumina has reasonable strength to stand up to chemical attack and structural and/or mechanical strength to stand up to particular environmental conditions. The $Al_2O_3$ is also present in the form of micron-sized reactive alumina in amounts of from about 2 to 10%, preferably 2 to 5%. The use of micron-sized reactive alumina in the amounts set forth above is critical in the present invention in that the reactive alumina aids in achieving a homogeneously distributed bonding phase and a suitable slurry rheology while allowing the plastic materials incorporated in the slurry, which tend to be reactive to the molten metal, to be held to a minimum.

Montmorillonite in an amount of from about 1 to 5%, preferably 1 to 3% has been found to be a particularly important additive to the slurry composition of the present invention. The montmorillonite is a highly plastic material whose composition is approximately $Al_2O_3.4SiO_2.H_2O$. It has been found that the montmorillonite is more plastic than bentonite. The use of a small percentage of highly plastic montmorillonite rather than bentonite allows for a suitable thixotropic rheology to be achieved while actually increasing the intrinsic strength of the resulting filter composition. The montmorillonite acts in synergism with the micron-sized reactive alumina to achieve a homogeneously distributed bonding phase while at the same time improving the intrinsic strength of the resulting filter element.

In addition to the foregoing, it is an additional critical feature of the present invention that a ceramic fiber material be added to the aqueous slurry in a range of from about 1 to 10%, preferably 1 to 3%. It has been found that an addition of more than 10% by weight of ceramic fibers to the slurry results in a clumping of the fibers and therefore good dispersion of the fibers in the slurry cannot be obtained. An addition of ceramic fibers in excess of 3% shows a relatively minor increase in strength. In the preferred 1 to 3% range significant strength improvement is obtained and the fiber is easily dispersed throughout the slurry as no clumping of the fibers occurs. The ceramic fibers act as a crack growth inhibitor and thereby actually increases the intrinsic strength of the resulting filter element. The preferred ceramic fiber for use in the slurry of the present invention is alumina-silicate fibers due to their generally low cost. However, additional refractory fibers such as alumina and zirconia as well as others could readily be used.

In addition to the foregoing, one provides from 2.5 to 25% of an air setting agent which is substantially nonreactive to the molten metal. The air setting or bonding agent sets up or hardens the ceramic slurry without the need for heating, and preferably by drying, normally by a chemical reaction, while heating to moderate temperatures. The preferred air setting agent is aluminum orthophosphate, preferably in the form of a 50% aqueous solution. Other air setting agents which may be employed include, for example, magnesium orthoborate, aluminum hydroxy chloride, etc. Alkaline metal silicates such as sodium silicates may be employed at least in part; however, these are less desirable since melting and consequent loss of set occurs at temperatures around 1500° F. Furthermore, the silicon contents thereof, and perhaps the sodium content, may become dissolved in the melt. Similarly, ethyl silicate and other phosphates may be employed but are less desirable. Aluminum orthophosphate is particularly preferred due to its very desirable combination of properties, that is, nonreactivity, stability over a wide range of temperatures and good setting properties.

As indicated hereinabove, the air setting agent is preferably added as an aqueous suspension including equal parts of binder and water particularly in the case of aluminum orthophosphate. The binder provides strength before the formation of the ceramic bond, that is, after the burning off or volatilization of the web of flexible foam material. The binder material provides sufficient strength to hold the mixture together for formation of the final product. In fact, the stability and strength of the chemical bond provided by the preferred air setting agent is sufficient for many applications to enable use of the product at this stage without high temperature sintering. This strength is substantial and exists over a wide temperature range. The preferred embodiment utilizes from 15 to 25% of aluminum orthophosphate.

As indicated hereinabove, the slurry is an aqueous slurry which contains a certain amount of water in order to aid in controlling viscosity so that one can impregnate the foam material with the slurry and also to enable one to work conveniently with the slurry. Generally from 10 to 40% water is present in the slurry with some of this water being added as an aqueous solution of the aluminum orthophosphate.

The resultant product is a bonded ceramic foam material having an open cell structure characterized by a plurality of interconnected voids surrounded by a web of ceramic. Naturally, the ceramic foam may have any desired configuration based on the configuration needed for the particular molten metal filtration process. Although naturally these configurations can be many and varied, particular configurations may be preferred for filtration in a transfer trough between the furnace and the casting mold in filtering molten aluminum. A wide variety of suitable configurations may be readily and conveniently prepared in view of the flexibility afforded by the preparation process utilized herein. It is a particular advantage of the ceramic foam material of the present invention that said ceramic foam has substantial high temperature strength and is capable of withstanding attack by molten metal. Furthermore, the filter of the present invention is advantageous in that excessive heads of molten metal are not required in order to start the filtration process.

In accordance with the present invention the specific features thereof will be more readily understandable from a consideration of the following illustrative example.

EXAMPLE

A polyurethane foam material was provided having a thickness of 2 inches and containing 30 pores per linear inch. An aqueous ceramic slurry was provided having the following composition: 62.3% of 325 mesh calcined $Al_2O_3$, 3.6% micron-sized reactive alumina, 1.1% montmorillonite, 1.0% ceramic grade alumina-silicate fiber, 22.8% aluminum orthophosphate as an aqueous solution with an equal amount of water and an additional 9.2% water. The foam material was immersed in the slurry and kneaded to remove air and substantially fill the voids with the slurry and also to coat the fibrous webs of the foam with the slurry. The resultant impregnated foam was subjected to compression to squeeze approximately 80% of the slurry out of the foam by passing the impregnated foam through preset rollers. The material was then dried and fired to provide an open cell ceramic foam material having a configuration of the original polyurethane foam material. The resulting filter element was then compared to a filter element prepared from an aqueous slurry comprising 47% $Al_2O_3$, 13% $Cr_2O_3$, 3.5% koline, 1.0% bentonite and 14.5% aluminum orthophosphate added as an aqueous solution with an equal amount of water as set forth in Example I of previously noted U.S. Pat. No. 3,947,363.

The compressive strength of the filter element of the present invention was found to be 50% greater than that filter element prepared from the alumina-chromia composition and bending strengths were found to be 10 to 20% higher. In addition, the filter element of the present invention was used successfully in filtering both molten aluminum and molten copper with results comparable to the alumina-chromia filter element.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A ceramic foam filter for use in filtering molten metal having an open cell structure characterized by a plurality of interconnected voids surrounded by a web of ceramic, said foam consisting essentially of the following composition: 55 to 70% $Al_2O_3$, 2 to 10% micron-sized reactive alumina, 1 to 5% montmorillonite and 1 to 10% ceramic fibers wherein said micron-sized reactive alumina acts in synergism with said montmorillonite to achieve a homogeneously distributed bonding phase and a suitable slurry rheology whereby the compressive and bending strengths of the ceramic foam filter is substantially increased as compared with alumina-chromia filter elements.

2. A filter according to claim 1 containing from 2.5 to 25% of an air setting agent which is substantially nonreactive to the molten metal.

3. A filter according to claim 2 wherein said air setting agent is aluminum orthophosphate.

4. A filter according to claim 3 containing from 15 to 25% aluminum orthophosphate.

5. A filter according to claim 1 containing from 60 to 65% $Al_2O_3$.

6. A filter according to claim 1 containing from 2 to 5% micron-sized reactive alumina.

7. A filter according to claim 1 containing from 1 to 3% ceramic fibers.

8. A filter according to claim 7 wherein said ceramic fibers are alumina-silicate fibers.

* * * * *